United States Patent [19]
von Allwörden

[11] 4,153,269
[45] May 8, 1979

[54] HYDRAULICALLY OPERATED VARIABLE LENGTH TOP GUIDE COUPLING MEMBER

[75] Inventor: Wilhelm von Allwörden, Erbach, Fed. Rep. of Germany

[73] Assignee: Jean Walterscheid GmbH, Lohmar, Fed. Rep. of Germany

[21] Appl. No.: 839,298

[22] Filed: Oct. 4, 1977

[30] Foreign Application Priority Data

Oct. 9, 1976 [DE] Fed. Rep. of Germany ....... 2645752

[51] Int. Cl.$^2$ ............................................. B60D 1/04
[52] U.S. Cl. ..................................... 280/482; 91/422
[58] Field of Search .............. 280/482, 460 A, 461 A; 91/420, 422

[56] References Cited

U.S. PATENT DOCUMENTS

| 2,720,755 | 10/1955 | Gardiner | 91/420 |
| 3,561,789 | 2/1971 | Stikeleather | 280/461 A |
| 3,641,875 | 2/1972 | Kodalle | 91/420 |

Primary Examiner—Joseph F. Peters, Jr.
Assistant Examiner—R. Schrecengost
Attorney, Agent, or Firm—Toren, McGeady and Stanger

[57] ABSTRACT

A hydraulically operated variable length top guide coupling member for use in three point linkage couplings for attaching agricultural implements to farm tractors includes a cylinder and a main piston with piston rod carried for longitudinal movement within the cylinder to thereby vary the length of the coupling member. Articulation means are carried at one end of the cylinder and at the other end of the piston rod for connecting the coupling member between a tractor and an agricultural implement. A pair of hydraulic lines provide communication between a source of hydraulic fluid and cylinder spaces on opposite sides of the main piston. A one-way valve is located in the path of communication between each of the hydraulic lines and the respective cylinder spaces. A control piston is carried between the two one-way valves for controlling opening of the valves. Application of hydraulic pressure to one of the hydraulic lines will open its respective one-way valve to permit hydraulic fluid to flow into the cylinder space on one or the other side of the main piston. Hydraulic pressure also acts on the control piston causing it to open the other one-way valve and permit hydraulic fluid to flow out of the other cylinder space into the other hydraulic line. Hydraulic pressure acting on the main piston will thus cause it to move within the cylinder to vary the length of the coupling member. The capability for immobilizing the main piston within the cylinder to fix the length of the coupling member to a desired position is also provided.

3 Claims, 8 Drawing Figures

HYDRAULICALLY OPERATED VARIABLE LENGTH TOP GUIDE COUPLING MEMBER

BACKGROUND OF THE INVENTION

The present invention relates to a coupling member forming the top guide in a three point linkage coupling used for attaching various kinds of agricultural implements to farm tractors. More particularly, the invention relates to such a top guide coupling member which is hydraulically operated to vary its length. The variable length top guide coupling member of the present invention is of the kind having a cylinder carrying a main piston with a piston rod, and articulation means at opposite ends for attachment between an agricultural implement and a farm tractor. Hydraulic lines are connected between a hydraulic system in the tractor and the top guide coupling member to provide a source of hydraulic operating fluid.

Hydraulically operated variable length top guide coupling members have been known in the art, such as from German AS No. 2 025 040, and German No. AS 2 206 195.

In these prior arrangements hydraulic pressure is applied to the piston of the top guide by means of control valves of the slide or piston valve type. Other valves to maintain pressure at a constant level are provided between the slide valves and the cylinder spaces on opposite sides of the piston to prevent leakage losses which inevitably occur in slide valves.

In view of the fact that these constant-pressure valves are set to open at a predetermined pressure, and that this pressure is of the order of magnitude of maximum pressure in the hydraulic system of the tractor, the maximum available working pressure in the cylinders is therefore limited to values which correspond to the pressure in the tractor hydraulic system.

On the other hand, the forces which are likely to occur when working with heavy equipment, e.g., multi-share ploughs, are of such magnitude that they may easily amount to a multiple of the forces which can be controlled by the tractor hydraulic system. In theory this problem might be solved by increasing the cylinder diameter, but this is an impractical solution because of excessively large space requirements that would result.

A further development in hydraulically operated variable length top guide coupling members has been to provide an actual-value donor device in association with a comparator of designed value to actual value and an adjusting device. The control slide will be actuated in such a way that it is possible to set the device for a pre-selected length adjustment and to make sure that this adjusted length will be preserved even under the influence of extraneous forces, by virtue of a continuous comparison between designed and actual values. Such an arrangement also allows a pre-selected length setting to be repeatedly reproduced.

However, the above described control system comparing designed value to actual value is expensive and not very suitable for the rough working conditions to which agricultural equipment is subjected. Pressure limiting valves are provided for the protection of connecting hoses against violent pressure shocks of the kind likely to occur during service. This, however, means a further increase in costs. Additional valves also present an additional source of potential malfunction.

It is therefore the object of the present invention to provide a hydraulically operated variable length top guide coupling member which is capable of absorbing operative pressures considerably in excess of the maximum pressure values in the tractor hydraulic system and which can be manufactured at economically acceptable costs, and wherein the hydraulic lines or hoses will never be exposed to a pressure exceeding the maximum pressure of the tractor hydraulic system.

Other objects, features and advantages of the present invention will become more apparent from the detailed description of the invention in connection with the accompanying drawings, to be described more fully hereinafter.

SUMMARY OF THE INVENTION

The foregoing object is generally accomplished by providing a first hydraulic line forming a first path of communication between a source of hydraulic fluid and a first space within the cylinder of the coupling member on one side of the main piston which is opposite the side having the piston rod, a second hydraulic line providing a second path of communication between a source of hydraulic fluid and a second space within the cylinder on the side of the main piston having the piston rod, a first one-way valve in the path of communication between the first hydraulic line and the first cylinder space for closing the first path of communication, a second one-way valve in the path of communication between the second hydraulic line and the second cylinder space for closing the second path of communication, and a control piston located between the first and second one-way valves for controlling the opening of the first and second one-way valves. When hydraulic pressure is applied to either the first or second hydraulic lines, the respective one-way valve will be opened by the force of hydraulic pressure acting on it to permit hydraulic fluid to flow into either the first or second cylinder space on one or the ofther side of the main piston to thereby cause the main piston to longitudinally move within the cylinder for varying the length of the coupling member. The hydraulic pressure in either the first or second hydraulic line also acts on the control piston to cause movement of the control piston to engage and open the other one-way valve to thus open communication between the other cylinder space and the other hydraulic line to permit hydraulic fluid to flow out of the other cylinder space. The hydraulic pressure within the first and second hydraulic lines will be less than the pressure required for opening one of the one-way valves when the coupling member is in an immobilized condition.

Because of this structure for controlling the length of the top guide coupling member, it is possible to maintain the adjusted length of the top guide with both hydraulic connections virtually relieved of pressure. Pressure shocks which occur during working with attached agricultural equipment can advance only as far as the one-way valves. The adjusted length will be maintained even if the hydraulic connecting lines were disconnected, or if a break or rupture were to occur in one or both of these lines. Accordingly, the hydraulic hoses need not be stronger than those required to carry the maximum pressure of the tractor hydraulic system.

A further feature of this invention is that a pre-selected length of the top guide coupling member can always be reproduceable.

This is accomplished by providing a control slide which is adapted to be mechanically actuated by means of an adjustable stop. The control slide is positioned in the hydraulic lines leading to the one-way valves and associated cylinder spaces. Such a control slide is adapted to connect the hydraulic lines with the source of hydraulic fluid wherein the prevailing pressure is lower than the pressure needed to actuate the one-way valves.

This allows the effective length of the top guide coupling member to be selectively determined in advance to suit a given agricultural machine or piece of equipment and to be subsequently reproduced whenever required. Furthermore, special execution of the control slide in such an arrangement will allow the top guide to be extended further from the selected adjusted and fixed position after stop-actuation of the slide.

A further characteristic feature of this invention, is that the two one-way valves and the control piston are carried within the main piston in the cylinder of the coupling member, and the hydraulic lines providing fluid for the first and second cylinder spaces extend through the piston rod.

This arrangement ensures that any pressure shocks which may occur in the hydraulic system will be contained within the hydraulic unit of the top guide coupling member.

The one-way valves and the controlling piston may also be combined with the mechanically actuated control slide in a single constructional unit adapted to be mounted on the outside of the cylinder.

A unit of this kind is suitable for subsequent fitting to existing hydraulically operated top guide coupling members.

BRIEF DESCRIPTION OF THE DRAWINGS

Various embodiments of the invention are hereinafter more specifically described with reference to the accompanying drawings, in which.

DESCRIPTION OF THE INVENTION

Figures 1, 3:
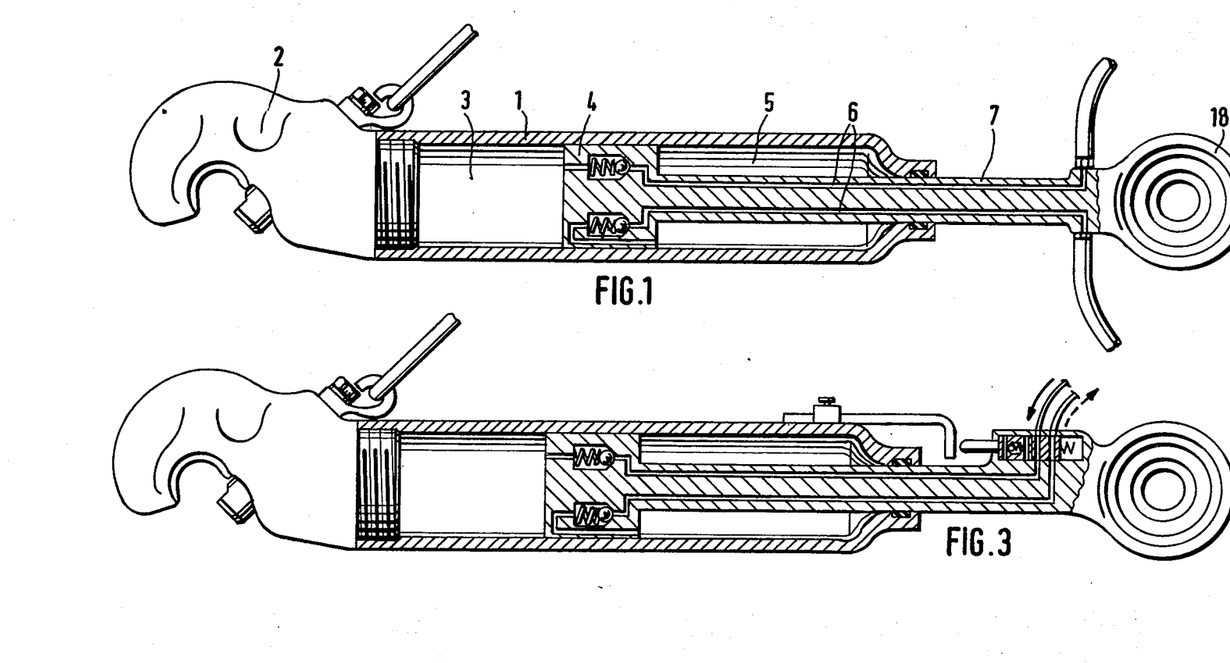
FIG. 1 is a partial elevational view and partial sectional view of a hydraulically operated top guide coupling member according to the present invention having one-way valves carried in the main piston within the cylinder.
FIG. 3 is a view similar to that of FIG. 1 further illustrating a top guide coupling member having an adjustable stop and a mechanically actuated controlling slide valve.

Referring now in more detail to the accompanying drawings, the top guide coupling member shown in FIG. 1, includes a main cylinder 1 having a coupling hook 2 mounted on one end thereof for connection to either a tractor or an agricultural implement to be coupled with the tractor.

Two one-way valves 8 and 12 are integrated into and carried within the interior of a main piston 4 which is carried for longitudinal movement within the main cylinder 1. A piston rod 7 is connected with main piston 4. A control piston 11 is arranged for axial movement in a piston guide 17 within the main piston 4 and is positioned between the one-way valves 8 and 12. Piston 11 has axially extending projections for engaging either of the one-way valves 8 or 12 for moving them to an open piston. Hydraulic lines 6 extend through piston rod 7 and provide a path of communication between a source of hydraulic fluid and cylinder spaces 3 and 5 on opposite sides of the main piston 4. Piston rod 7 carries appropriate connection means at an end located adjacent articulation eye 18 for connecting the hydraulic lines 6 to a source of hydraulic fluid, such as the hydraulic system within the tractor.

Figure 2:
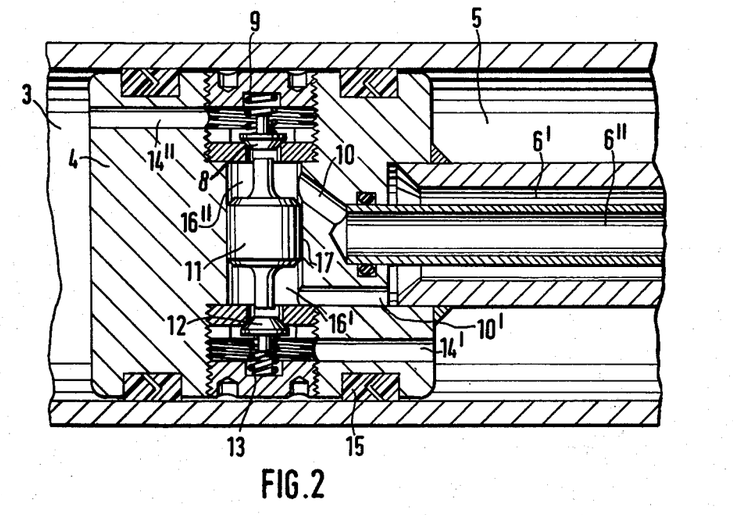
FIG. 2 is an enlarged sectional view taken through the cylinder and main piston of the top guide coupling member of the present invention showing the arrangement of one-way valves and their control piston.

The various steps to accomplish length adjustment and fixation or immobilization of the top guide coupling member will be described with reference to FIG. 2.

To increase the length of the top guide coupling member, hydraulic pressure is applied to hydraulic line 6''. Hydraulic line 6' will have no hydraulic pressure applied to it. Hydraulic fluid will therefore be permitted to flow through channel 10 into space 16'' on one side of the control piston 11. The pressure of the hydraulic fluid within the space 16'' will cause the one-way valve 8 to open against the influence of valve retaining spring 9. The pressure in the hydraulic fluid will then be permitted to pass through a bore 14'' into the cylinder space 3 on one side of the main piston 4 (the side opposite piston rod 7). Because of the pressure of the hydraulic fluid within space 16'' acting on control piston 11, it will move in a direction toward one-way valve 12 (a downward direction when viewing FIG. 2) within the piston guide 17. One of the axially extending projections on the piston 11 will then engage the one-way valve 12 and cause it to open against the influence of its retaining spring 13. As a result, the cylinder space 5, on the side of the main piston 4 having the piston rod 7, will be connected, through bore 14', with space 16' and through channel 10' with hydraulic line 6'. Hydraulic fluid can now therefore flow into the cylinder space 3 to expand this space while fluid previously contained in cylinder space 5 will flow out of this space into hydraulic line 6' allowing cylinder space 5 to contract. Hence, the overall length of the top guide coupling member will increase as a result of the main piston 4 being caused to move under the influence of hydraulic pressure in a direction to the right when viewing the figures.

If it is desired to shorten the length of the top guide coupling member, hydraulic pressure will be applied to hydraulic line 6', while hydraulic line 6'' will have no pressure applied to it. As a result, one-way valve 12 will open under the influence of hydraulic pressure within space 16' to permit hydraulic pressure to flow into cylinder space 5. Control piston 11 will operate in a manner described above but in an opposite direction to open one-way valve 8 against the influence of retaining spring 9 to thus allow hydraulic fluid previously within cylinder space 3 to flow through bore 14", channel 10 and into hydraulic line 6". As a result, hydraulic pressure will be acting on piston 4 to cause space 5 to expand and space 3 to contract. Main piston 4 will therefore be caused to move in a direction to the left when viewing the figures thus resulting in a decrease in the length of the top guide coupling member.

When the length of the top guide coupling member is adjusted to a desired position, pressure in both hydraulic lines 6' and 6" will be relieved. The one-way valves 8 and 12 will return to their closed position under the influence of their respective retaining springs 9 and 13. Control piston 11 will be pushed back to its neutral position by the spring associated with the one-way valve which was most previously influenced by the control piston. With the control piston 11 in its neutral position within piston guide 17, and with no hydraulic pressure acting in either of the hydraulic lines 6' or 6", the piston 4 and its piston rod 7 will be immobilized within cylinder 1 to thereby fix the length of the top guide coupling member, because both cylinder spaces 3 and 5 will be shut off by the one-way valves 8 and 12. Any pressure shocks which may occur in the attached agricultural equipment will only tend to increase pressure on the one-way valves to retain them in their closed position thus increasing the seal of the one-way valves to remain in a closed position for as long as the pressure shocks continue. Seals 15 are also reinforced by any pressure increase due to other causes so that there can be no undesirable accidental deviation from the adjusted length position.

FIG. 3 shows the construction of a hydraulically operated top guide coupling member having an adjustable stop. As previously described, the two one-way valves 8 and 12, with control piston 11, are integrally assembled with the main piston 4, and hydraulic lines 6' and 6" extend through the piston rod 7. Coupling eye 18, which is provided at the outer end of piston rod 7, carries an upwardly directed shoulder or widened portion to accommodate the mechanically actuatable control slide 21.

A guide 19 for adjustable stop 20 is provided on the outer circumferential wall of cylinder 1. Stop 20 can be adjusted to any desired length through guide 19. With the use of stop 20 and control slide 21, an attached agricultural piece of equipment may be moved as often as desired into a preselected position, preferably into the desired working position. Because of the control slide mechanism, it is therefore possible to lengthen the top guide coupling member from a previously adjusted position.

The various operations of the control slide 21 are illustrated in FIGS. 4-7.

Figure 4:
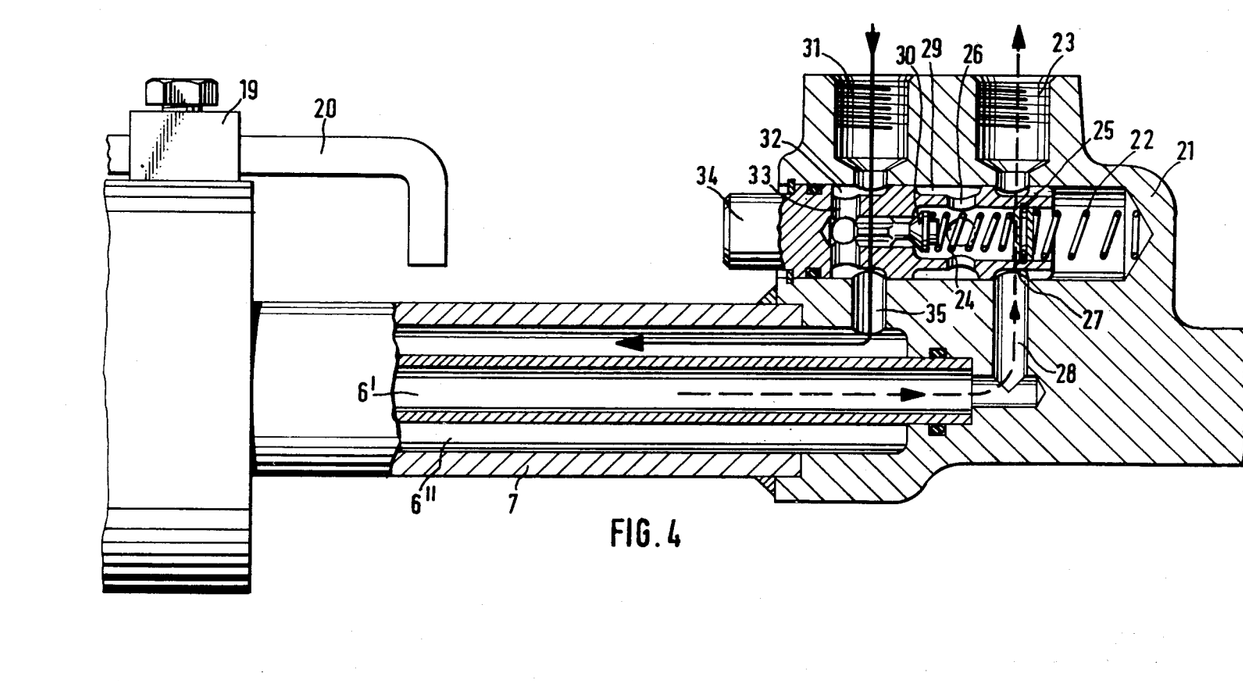
FIG. 4 is an enlarged partial elevational view and partial sectional view showing the controlling slide valve in section in a position for shortening the length of the top guide coupling member.

FIG. 4 illustrates the position of the control slide for shortening the length of the top guide coupling member or for lifting the trailing piece of agricultural equipment.

In this position, control slide 21 is in a non-actuated position and is maintained in this position by the compression or thrust spring 22. Hydraulic pressure enters through connection 31 into annular space 32 and further, through connection channel 35 into line 6", which extends through the piston rod 7. As a result, the associated one-way valve 12 will open and, as previously described, the other one-way valve 8 will also be opened by the influence of control piston 11. Hydraulic fluid, returning through hydraulic line 6', will pass through the connecting channel 28 into annular space 20 and will exit through connecting line 23.

With the elements occupying the positions shown, hydraulic fluid will enter valve space 25 until the force of working pressure applied to one side of auxiliary valve 30 through connecting channel 33 balances the force of pressure existing in valve space 25 augmented by the force of the valve spring.

Figure 5:
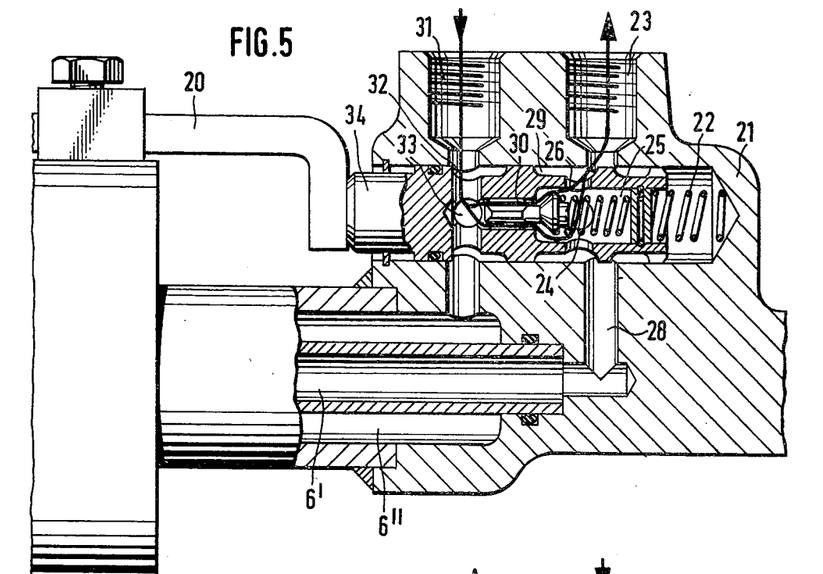
FIG. 5 is a view similar to that of FIG. 4 showing the controlling slide valve in the stop actuation position.

FIG. 5 illustrates the position of the control slide 21 in the stop-actuated position thereof. The stop 20 in this position has engaged an end of piston 34 and has displaced piston 34 in a direction opposite to the thrust of spring 22 (toward the right in the figure). The hydraulic pressure, which at this point is still acting at the line connection 31, acts through annular space 32 into connecting channel 33 causing auxiliary valve 30 to open against the biasing force of valve spring 24.

Hydraulic fluid will now be able to flow into valve space 25 and pass through the annular space 29 to the line connection 23. With the various elements in this position, hydraulic fluid from the supply line will be diverted at connection 31 through the auxiliary valve 30 to flow out toward connection 23 and return to the source of hydraulic fluid in the tractor hydraulic system.

As a result, in this position, both lines 6' and 6" between one-way valves 8 and 12, which are accommodated in piston 4, and the control slide 21 will be without hydraulic pressure so that both the one-way valves are in a closed position.

Figure 6:
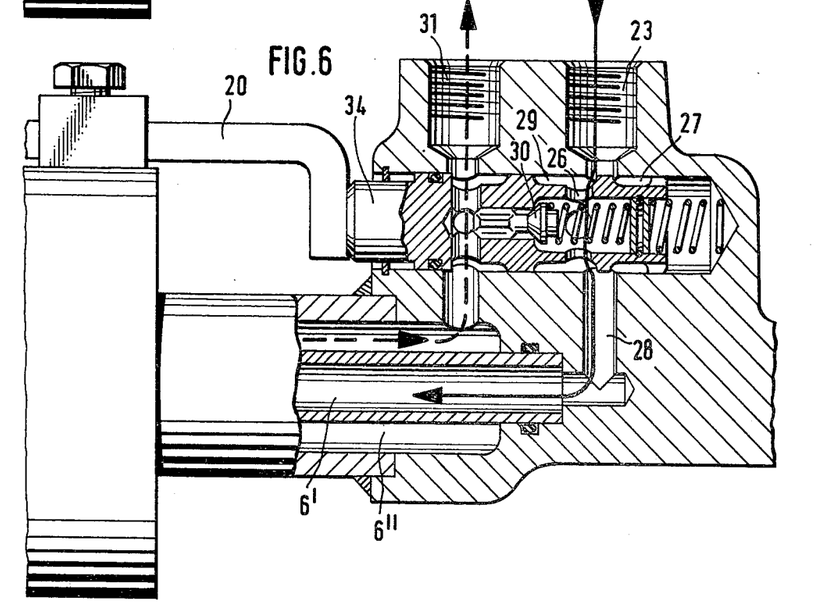
FIG. 6 is a view similar to that of FIGS. 4 and 5 showing the controlling slide valve in the position for increasing the length of the top guide coupling member with the aid of the stop actuated slide valve.

Increasing the length of the top guide coupling member with the control slide 21 actuated by stop 20, is illustrated in FIG. 6. In this condition, the hydraulic circuit works in reverse, so that hydraulic pressure will be present at line connection 23. Fluid will flow through the annular space 29 and the connecting channel 26, and through connecting channel 28 into line 6'. This will cause one-way valve 8 to open and control piston 11 to act on one-way valve 12 to thus release the return flow of hydraulic fluid from cylinder space 5.

Figure 7:
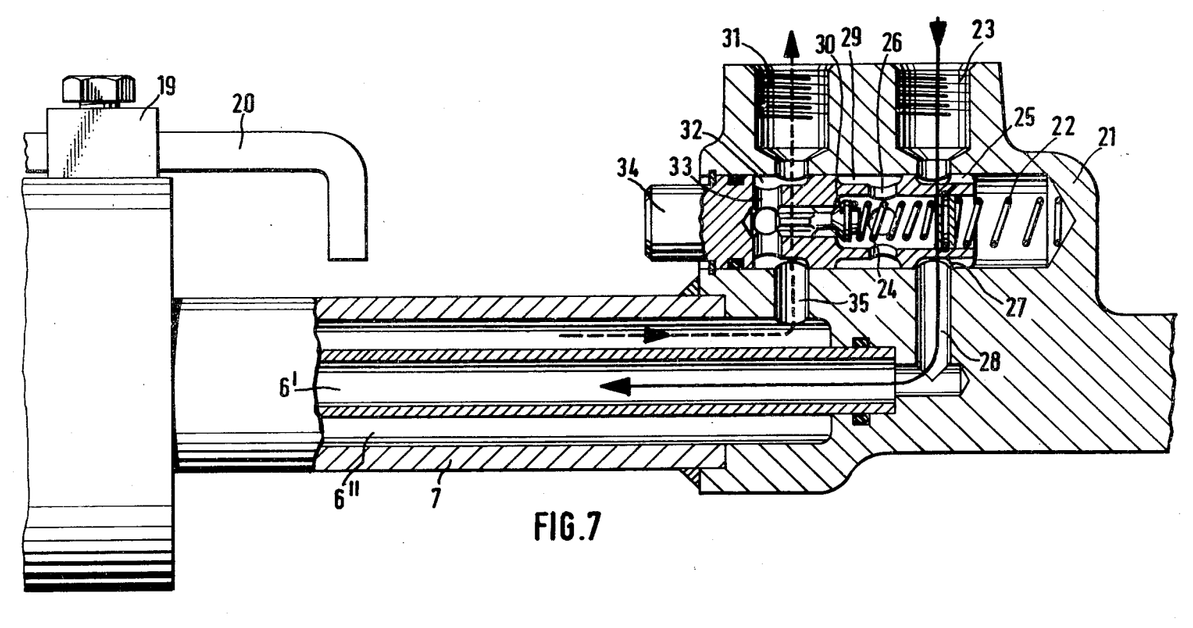
FIG. 7 is a view similar to that of FIGS. 4 through 6 showing the position of the controlling slide valve after the length of the top guide coupling member has continued to increase.

When the stop 20 becomes disengaged from the piston 34 of slide valve 21, piston 34 will resume its initial position and hydraulic fluid will flow through the control slide valve 21 as is shown in FIG. 7.

Figure 8:
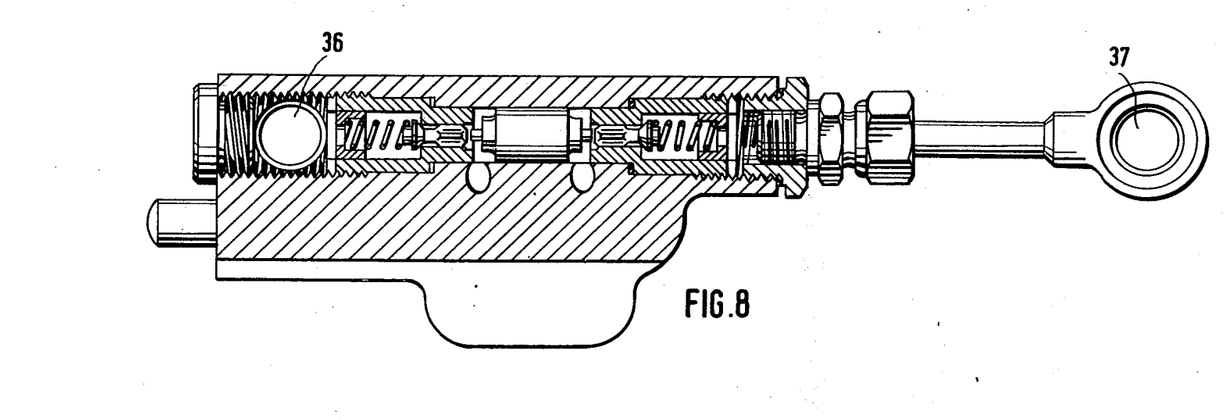
FIG. 8 illustrates an embodiment of the invention in which the mechanically actuated control slide is combined with the actual top guide coupling member length adjusting unit in a single construction element.

FIG. 8 illustrates an embodiment of the top guide length adjusting mechanism in which the actual adjusting control means are combined with the control slide valve. Connections 36 and 37 to cylinder spaces 3 and 5 can easily be adapted to existing standard connector fittings so that this unit is well suited for subsequent fitting to existing hydraulic operated top guide coupling members.

While the invention has been described and illustrated with respect to certain embodiments which produce satisfactory results, it will be appreciated by those skilled in the art after understanding the purposes of the invention, that various changes and modifications may be made without departing from the spirit and scope of the invention, and it is therefore intended to cover all such changes and modifications in the appended claims.

What is claimed is:

1. A hydraulically operated variable length coupling member for use in three point linkage couplings for attaching agricultural implements to farm tractors comprising a cylinder, a main piston and piston rod carried for longitudinal movement within said cylinder for varying the length of said coupling member, articulation means carried at opposite ends of said coupling member, a first hydraulic line providing a first path of communication between a source of hydraulic fluid and a first space within said cylinder on one side of said main piston opposite said piston rod, a second hydraulic line providing a second path of communication between a source of hydraulic fluid and a second space within said cylinder on the side of said main piston having said piston rod, a first one-way valve in the path of communication between said first hydraulic line and said first cylinder space for closing said first path, a second one-way valve in the path of communication between said second hydraulic line and said second cylinder space for closing said second path, a control piston located between said first and second one-way valves for controlling the opening of said first and second one-way valves, whereby upon application of hydraulic pressure to said first hydraulic line said first one-way valve will be opened by the force of hydraulic pressure acting thereon to permit hydraulic fluid to flow into said first cylinder space to cause longitudinal movement of said main piston within said cylinder in a first direction, said hydraulic pressure in said first hydraulic line also acting on said control piston to cause movement thereof to open said second one-way valve to open communication between said second cylinder space and said second hydraulic line to permit hydraulic fluid to flow out of said second cylinder space, and whereby upon application of hydraulic pressure to said second hydraulic line said second one-way valve will be opened by the force of hydraulic pressure acting thereon to permit fluid to flow into said second cylinder space to cause longitudinal movement of said main piston within said cylinder in a second direction opposite to said first direction, said hydraulic pressure in said second hydraulic line also acting on said control piston to cause movement thereof to open said first one-way valve to open communication between said first cylinder space and said first hydraulic line to permit hydraulic fluid to flow out of said first cylinder space, means for immobiliztinq said main piston within said cylinder to fix the length of said coupling member to a desired length position, said first and second hydraulic lines having hydraulic pressure therein which is less than the pressure required for opening one of said one-way valves when said coupling member is in an immobilized condition, a control slide positioned in said first and second hydraulic lines between said source of hydraulic fluid and said first and second one-way valves, and an adjustable stop member for mechanically actuating said control slide to cause length adjustment of said coupling member for repeatable selection of a pre-selected length, whereby said first and second hydraulic lines are selectively connected with said source of hydraulic fluid upon actuation of said control slide by said stop member.

2. The hydraulically operated variable length coupling member according to claim 1 wherein said first and second one-way valves and said control piston are carried within said main piston, and wherein said first and second hydraulic lines extend through said piston rod.

3. The hydraulically operated variable length coupling member according to claim 1 wherein said first and second one-way valves, said control piston and said control slide are combined in a single assembly unit adapted to be externally mounted on said cylinder.

* * * * *